(No Model.)
S. A. WHITE.
BICYCLE.
No. 522,570.  Patented July 3, 1894.
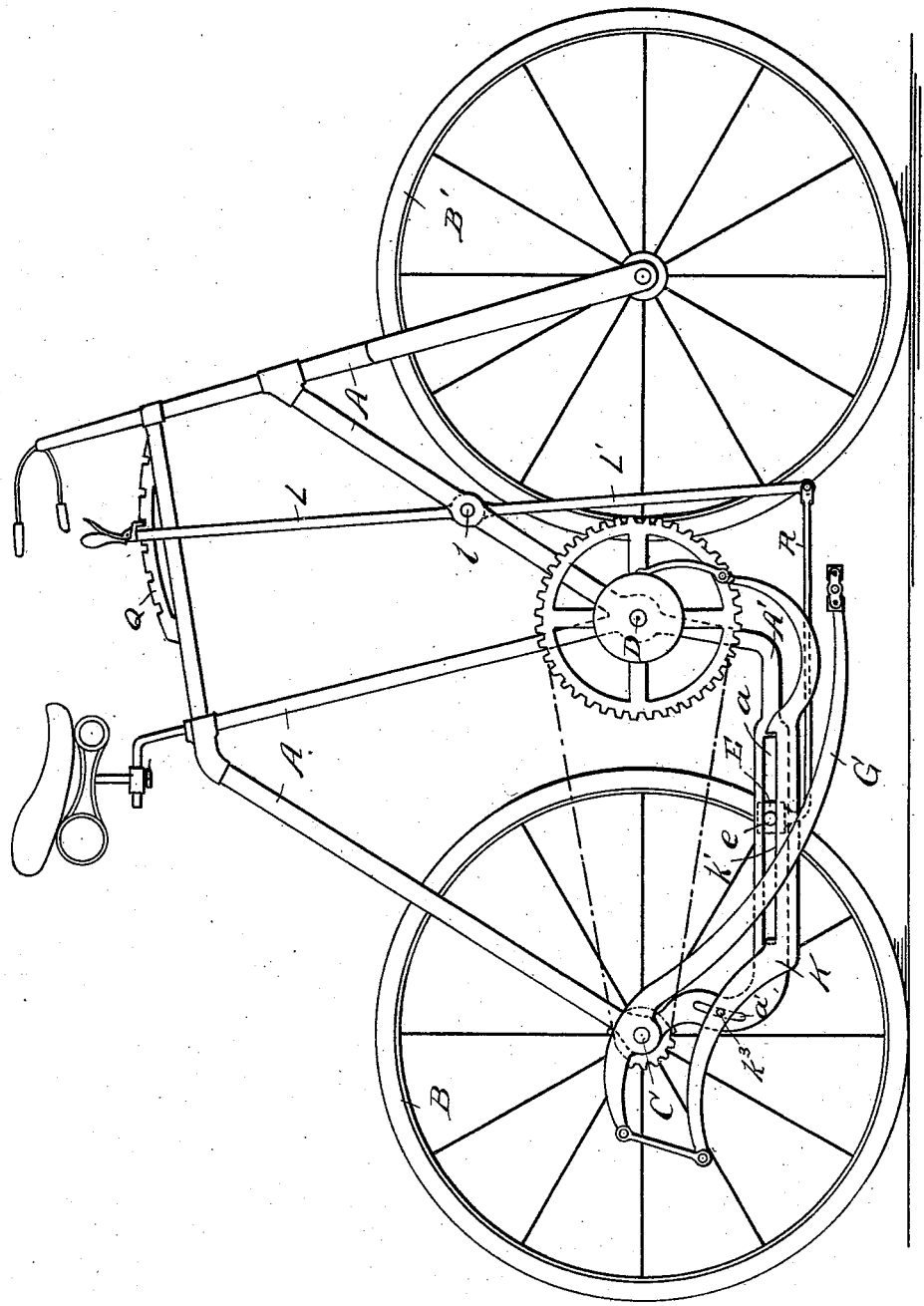
Witnesses
Ed. A. Kelly
David Levan
Samuel A. White, Inventor
By Attorney in testimony whereof I affix my signature

UNITED STATES PATENT OFFICE.

SAMUEL A. WHITE, OF HARRISBURG, PENNSYLVANIA.

BICYCLE.

SPECIFICATION forming part of Letters Patent No. 522,570, dated July 3, 1894.

Application filed September 28, 1893. Serial No. 486,671. (No model.)

*To all whom it may concern:*

Be it known that I, SAMUEL A. WHITE, a citizen of the United States, residing at Harrisburg, in the county of Dauphin, State of Pennsylvania, have invented certain Improvements in Bicycles, of which the following is a specification.

My present invention relates to certain improvements in bicycles which are especially applicable to the mechanism shown and described in Patent No. 505,738 issued to me September 26, 1893.

The invention is fully described in connection with the accompanying drawing which shows a side elevation of a machine having my improvements applied thereto.

A represents the frame, B the main driving wheel and B' the steering wheel of a bicycle, the operation of which is effected through the sprocket wheel fixed to the usual transverse shaft D located between the two wheels and connected to the driving axle C by a chain.

The sprocket and ratchet wheels fixed to the shaft D are rotated by the oscillating movement of the forward end of the operating lever K in any desired manner. This lever K is fulcrumed at an intermediate point to the frame and as shown is operated indirectly by a pedal lever G in the manner described in my prior application referred to.

For the purpose of conveniently changing the operating leverage so as to adapt it for different grades, I provide an adjustable fulcrum piece E for the lever K. This piece has a squared body which rides in the longitudinal slot $a$ in the lowest bar A' of the frame, and an extension $e$ beyond the bar A' against which the edge $k'$ of the lever K is pressed by the action of the foot upon the pedal lever G. It is adjustable horizontally by means of a hand lever L the forked lower end L' of which is connected by rods R to the fulcrum pieces on either side of the machine. This hand lever is pivoted at a convenient point $l$ to the frame A and at its upper end engages a notched bar or quadrant Q by means of which it may be locked in any desired position. In order to maintain the lever K in proper position and at the same time permit it to swing freely on the fulcrum pieces E wherever the latter may be moved to within the range of its adjustment, I provide a slot $a'$ in the rear portion of the frame in which a fixed pin $k^3$ in the lever rides up and down a greater or less distance dependent upon the location of the fulcrum pieces.

In the position of the hand lever L indicated in the drawing the fulcrum E is shifted so as to increase the leverage for hill climbing with a corresponding reduction of speed. By moving the hand lever forward one or more notches the leverage may be decreased for level ground, the change being effected without interfering in the least with the continued operation of the machine.

What I claim is—

In a bicycle or similar vehicle having a driving wheel arranged in gear with a sprocket wheel shaft, the combination with a pedal lever fulcrumed intermediately of its length on the rear axle, of an operating lever K linked to said pedal lever, a fulcrum for said lever K adjustably secured to the frame, and mechanism for varying the position of said fulcrum, all substantially as set forth.

In testimony whereof I affix my signature in presence of two witnesses.

SAMUEL A. WHITE.

Witnesses:
W. G. STEWART,
ADAM L. OTTERBEIN.